United States Patent [19]
Bullivant

[11] 3,773,124
[45] Nov. 20, 1973

[54] ELECTRONIC WEIGHT TRANSMITTER

[75] Inventor: Kenneth W. Bullivant, Glassboro, N.J.

[73] Assignee: K-Tron Corporation, Glassboro, N.J.

[22] Filed: Aug. 16, 1972

[21] Appl. No.: 281,250

[52] U.S. Cl. .................................. 177/210, 177/211
[51] Int. Cl. .............................................. G01g 3/14
[58] Field of Search ................... 177/210, 211, 235; 73/133

[56] References Cited
UNITED STATES PATENTS

| | | | |
|---|---|---|---|
| 2,954,969 | 10/1960 | McCullough et al. | 177/211 |
| 3,492,865 | 2/1970 | Johnson | 177/210 |
| 3,360,062 | 12/1967 | Potter | 177/210 |
| 3,595,331 | 7/1971 | Gast et al. | 177/210 |

Primary Examiner—Richard B. Wilkinson
Assistant Examiner—Vit W. Miska
Attorney—Arthur H. Seidel et al.

[57] ABSTRACT

An electronic weight transmitter which produces an electrical signal proportional to the gross or net weight applied thereto. The electronic weight transmitter utilizes a parallelogram structure having substantially frictionless pivots at three of its pivot points and a torsion bar at its fourth pivot point. The parallelogram structure is mounted to a base and the weight to be measured is applied to the parallelogram structure. Movement of the parallelogram structure is restrained by the torsion bar. Movement of the parallelogram structure against the restraining force of the torsion bar is converted into an electrical signal by means of a linear variable differential transformer. The core of the linear variable differential transformer is mounted for movement with the parallelogram structure and the windings of the linear variable differential transformer are mounted on the base.

8 Claims, 5 Drawing Figures

ELECTRONIC WEIGHT TRANSMITTER

This invention relates to an electronic weight transmitter. More particularly, this invention relates to an electronic weight transmitter using a torsion bar restrained parallelogram structure as the weight receiving means and a linear variable differential transformer to convert the mechanical movement into an electrical signal.

The electronic weight transmitter or load cell of the present invention may be used to measure the weight of loads applied to the electronic weight transmitter, or in other words, to produce an electrical signal proportional to the weight of the load applied to the electronic weight transmitter or load cell. Pneumatic and mechanical weight transmitters or load cells have been known in the prior art. With respect to pneumatic weight transmitters, reference may be had to U.S. Pat. Nos. 3,371,732; 3,425,503; and 3,441,100 which are assigned to the assignee of the present invention.

The electronic weight transmitter of the present invention may be used in various types of weighing operations. In one particular application, the electronic weight transmitter of the present invention may be used for weighing material in transit on a conveyor belt. An application of a weight transmitter or load cell for weighing material in transit on a conveyor belt is illustrated in U.S. Pat. No. 3,528,586 which is also assigned to the assignee of the present invention.

The electronic weight transmitter or electronic load cell of the present invention provides numerous advantages over the prior art. Among the advantages of the electronic weight transmitter of the present invention is that a minimum mechanical deflection is required between zero and full load condition. Other advantages include the fact that there is a minimum of deflection perpendicular to the direction in which the load is applied due to the use of a parallelogram structure. The range of weight measurement by the weight transmitter may be changed by substituting a torsion bar of the proper range in the parallelogram structure. Taring in the present invention may be accomplished by attaching a simple counterweight to the parallelogram structure. Numerous other advantages, such as various adjustments without the loss of sensitivity, will become apparent from the detailed description to follow hereinafter.

Briefly, in accordance with the present invention, there is provided an electronic weight transmitter having a parallelogram structure mounted to a base. The parallelogram structure may be comprised of three members with two of the members pivotally mounted to the base and a third member pivotally connected to the other two members. Three of the pivot points may be provided with substantially frictionless pivot means and the fourth being provided with a torsion bar to restrain movement of the parallelogram structure. An electrical transducer is provided for converting the movement of the parallelogram structure to a proportional electrical signal when a weight or load is applied to the parallelogram structure. In one embodiment, the electrical transducer may be a linear variable differential transformer in which the movement of the parallelogram structure causes movement of the core in the linear variable differential transformer.

For the purpose of illustrating the invention, there are shown in the drawings forms which are presently preferred; it being understood, however, that this invention is not limited to the precise arrangements and instrumentalities shown.

Figure 1:
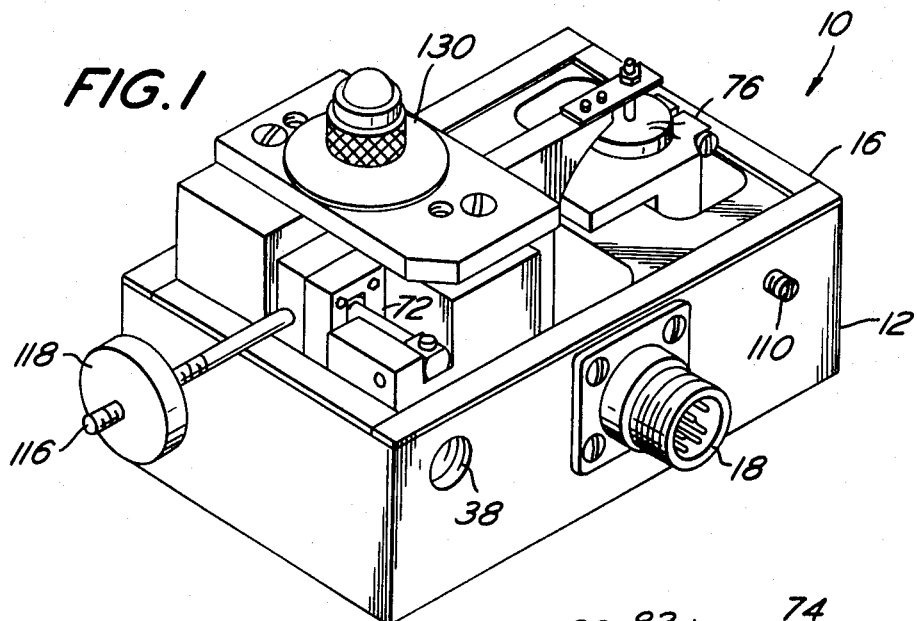
FIG. 1 is a perspective view of an electronic weight transmitter in accordance with the present invention.
Figure 4:
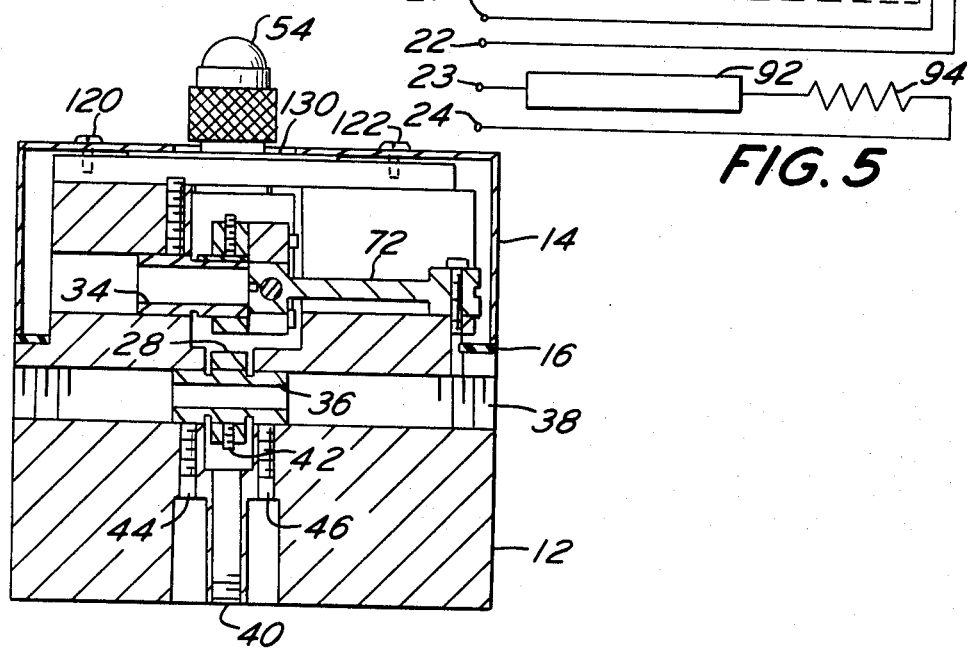
FIG. 4 is a cross sectional view taken along line 4—4 of FIG. 3.
Figure 2:
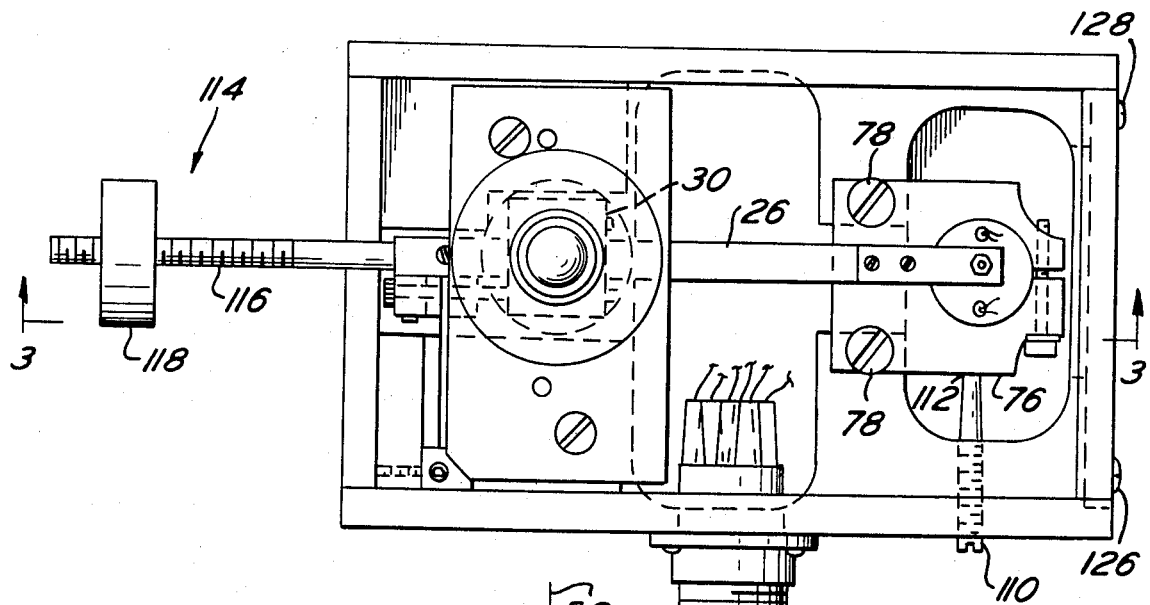
FIG. 2 is a top view of the weight transmitter shown in FIG. 1.
Figure 3:
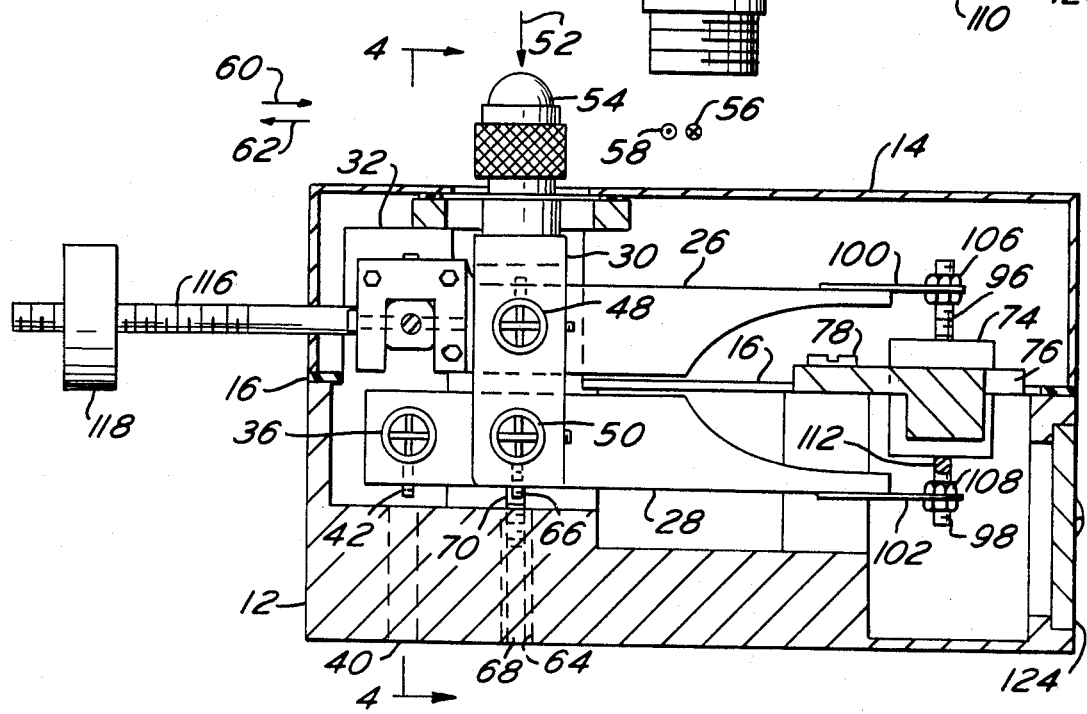
FIG. 3 is a cross sectional view taken along line 3—3 of FIG. 2.

Referring now to the drawings in detail, wherein like numerals indicate like elements, there is shown in FIG. 1 an electronic weight transmitter shown generally as 10. Electronic weight transmitter 10 is provided with a base 12 and a cover 14 as shown in FIGS. 3 and 4. The cover 14 is seated on a rubber dust seal 16. However, dust seal 16 may be made of any other suitable material. Base 12 is provided with electrical connector 18 which has six pin connectors corresponding to leads 19–24 in FIG. 5.

The following description may be best understood by reference to FIGS. 1–4 in which the structure is more clearly seen from one or more of these figures. As may best be seen in FIG. 3, a parallelogram structure is formed by a first member 26, a second member 28 and third member 30 in conjunction with projecting member 32 of base 12. First member 26 is pivotally mounted on projecting member 32 by means of a flexural pivot means 34 which is best shown in FIG. 4. Flexural pivot means 34 and other flexural pivot means used herein may be flexural pivots obtained from Fluid Power Division of Bendix Corporation or may be any other suitable type of frictionless pivot means.

Second member 28 is mounted on projecting member 32 by means of flexural pivot means 36 which may best be seen in FIGS. 3 and 4. As may be seen in FIG. 4, a hole 38 may be bored into projecting member 32 to allow insertion of flexural pivot means 36. The ends of hole 38 are threaded in order to allow the insertion of a threaded plug in order to prevent the entry of dirt, moisture or other foreign matter. Similarly, hole 40 is provided in base 12 in order to allow access to locking means 42. Locking means 42 may be a hex bolt which may be threadably mounted in second member 28 in order to lock second member 28 to flexural pivot means 36. Hole 40 is also provided with threads at its outer end in order that a threaded plug may be inserted in order to seal hole 40. Threaded bores 44 and 46 are provided in order to lock flexural pivot means 36 to base 12. It may be noted that base 12 and its projecting member 32 are a unitary structure with no clear dividing line between them. This terminology has been adopted as an aid in pointing out and illustrating the various parts of the structure of the present invention.

Third member 30 is connected to first member 26 by means of flexural pivot means 48 which may best be seen in FIG. 3. Third member 30 is connected to second member 28 by flexural pivot means 50. Flexural pivot means 48 and 50 are predetermined distances from flexural pivot means 34 and 36, respectively, in order to form a parallelogram structure. Third member 30 may be in the form of a yoke as shown in the drawings in order to provide a sturdier structure which is resistant to deflection perpendicular to a load applied in the direction of arrow 52. That is, when a load is applied to load receiving means 54 in the direction of arrow 52, the yoke of member 30 which extends at both sides of first member 26 and second member 28 prevents motion into or out of the page as shown by arrows 56 and 58, respectively, of members 26 and 28. Similarly, the flexural pivot means, especially flexural pivot means 34 and 36 prevent motion in the direction of arrows 60 and 62 when a load is applied to load receiving means 54.

Hole 64, as shown in dotted outline form in FIG. 3, is provided to allow access to locking means 66 which locks flexural pivot 50 into third member 30. Threaded bores 68 in base 12 and Allen head screw 70 are provided in order to provide an adjustable stop means for the parallelogram structure. Threaded bore 68 is physically located behind hole 64 in FIG. 3.

The parallelogram structure is restrained from movement by means of torsion bar 72 which may be best seen in FIGS. 1 and 4. In a preferred embodiment, torsion bar 72 is mounted between base 12 and the pivot point at which flexural pivot means 34 is located in order to allow easy access for ease in substitution of another torsion bar. That is, if it were desired to change the range of weight measurement, a new torsion bar having the proper range of torsion would be substituted for torsion bar 72. However, it is understood that the torsion bar may be located at any one of the four pivot points of the parallelogram structure. For example, the cantilevered flexural pivot means 34 could be mounted in second member 28 and the torsion bar mounted between base 12 and one side of member 28. Similarly, a short torsion bar could be mounted between one of the legs or branches of the yoke of member 30 and one of the members 26 or 28. That is, at the pivot point at which the torsion bar would be located, a cantilever type of flexural pivot similar to flexural pivot means 34 would be located between that member, member 26 or 28, and the other side of the yoke of member 30.

The motion of the parallelogram structure caused by applying a load to load receiving means 54 in the direction of arrow 52 is transformed to an electrical signal by an electrical transducer. In a preferred embodiment as shown on the drawings, members 26 and 28 are extended with the core of a linear variable differential transformer mounted between their ends. Because of the length of members 26 and 28, a small vertical deflection of load receiving means 54 in the direction of arrow 52 causes a substantially greater movement of the core mounted between the ends of members 26 and 28. This motion multiplication provides a significant advantage in that it increases the sensitivity of the electronic weight transmitter.

Figure 5:
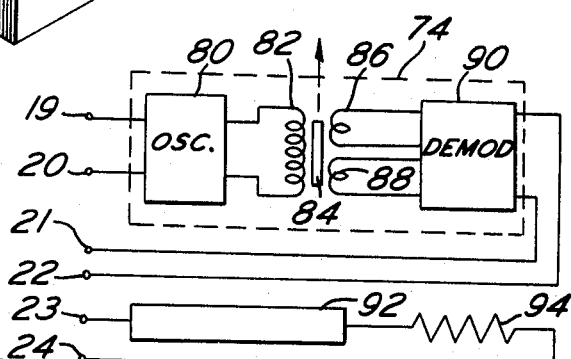
FIG. 5 is a schematic diagram, partially in block diagram form, of circuitry in accordance with the present invention.

The linear variable differential transformer 74 is mounted to the base 12 by means of mounting means 76. Mounting means 76 is mounted to base 12 by means of bolts 78. A schematic diagram of a suitable linear variable differential transformer is shown in FIG. 5. A suitable supply of direct current voltage is applied across terminals 19 and 20, which were discussed above and correspond to the pins of electrical connector 18. A suitable supply of voltage may be, for example, 6 volts d-c. Oscillator 80 may be a multivibrator or any other suitable type of oscillator. The output of oscillator 80 is fed to primary winding 82. Core 84, which is mounted between the ends of members 26 and 28, varies the coupling between primary winding 82 and secondary windings 86 and 88 when moved by the parallelogram structure. The outputs of secondary windings 86 and 88 are fed to a demodulator 90. The outputs of secondary windings 86 and 88 are each fed to a full wave bridge demodulator terminated in a load resistor and bypassed by a capacitor. The outputs of the two bridges are connected to deliver a differential voltage output across terminals 21 and 22. Although the demodulator circuitry described may be preferable, other suitable types of demodulator circuitry may be used to produce the differential output. Also, as mentioned above, various other types of transducers may be used to convert the mechanical motion to an electrical signal output.

Terminals or pins 23 and 24 are connected in series with a thermostat 92 and a resistor 94. Register 94 may be rated at approximately 50 watts in order to provide a heating capability. Thermostat 92 nad resistor 94 may be used to provide a relatively constant temperature within the electronic weight transmitter. That is, the temperature will be maintained within a temperature range by thermostat 92. When the temperature drops to the lower limit of the range, thermostat 92 will close the circuit thereby causing a current to flow through resistor 94 which results in heat being dissipated from resistor 94. When the temperature rises to the upper limit of the temperature range, the thermostat 92 opens the circuit and further heating ceases. The temperature range may be selected to be a few degrees between the lower and upper limits.

Although the core 84 of linear variable differential transformer 74 may be mounted from a single member, that is from first member 26 or second member 28, it is preferably mounted as shown in the drawings between the ends of members 26 and 28 in order to eliminate any cosine error caused by an arcuate movement of core 84 in contrast to a linear movement. Core 84 is mounted by means of threaded rods 96 and 98 between leaf spring members 100 and 102 which extend from the ends of members 26 and 28, respectively. The leaf springs 100 and 102 may preferably be made from a stainless steel. The leaf springs 100 and 102 flex slightly as members 26 and 28 move in a vertical direction. Leaf springs 100 and 102, nor neither of them, would be required if the core 84 were mounted from a single member. However, a significant advantage is provided in the form of increased accuracy by mounting core 84 and its threaded rods 96 and 98 between members 26 and 28 in order to eliminate any cosine error caused by the core moving in an arcuate path. In addition, the mounting of core 84 between two members, as contrasted with mounting core 84 from a single member, provides a damping factor which provides more reliable continuous weight indications.

Linear variable differential transformer 74 may be positioned, or its position changed, by loosening bolt 104 and moving linear variable differential transformer 74 vertically. In addition, the position of the core 84 within linear variable differential transformer 74 may be positioned for a zero load condition or for a specified tare by means of nuts 106 and 108. In addition, a fine adjustment to the position of linear variable differential transformer may be made by rotating adjusting means 110. Adjusting means 110 is provided with a threaded portion which cooperates with a threaded bore in base 12. The end of adjusting means 110 is tapered and the tapered portion of adjusting means 110 engages the lower end of linear variable differential transformer 74 as shown at 112. Adjusting means 110 provides a fine adjustment after the other adjustments have been made in order to produce an accurate zero reading with no load applied. Although the fine zero adjust could be accomplished by altering the electrical output signal, the mechanical fine zero adjust is preferred since it provides a significant advantage of a fine zero adjust without reducing the sensitivity of the electronic weight transmitter.

In addition to the above adjustments, which may be used to compensate for a fixed tare, counterweight means 114 may be optionally provided. Counter weight means 114 may be comprised of a threaded bar 116 which may be attached to member 26 and a counterweight 118 having threads to enable adjustment of the position of the counterweight along threaded bar 116. Counter weight means 114 has a significant advantage in that the tare weight may be easily and readily adjusted by simply rotating the counterweight 118 to the proper position without any need to make internal adjustments to the electronic weight transmitter. Therefore, the electronic weight transmitter may be readily adjusted to compensate for various tare weights. However, adjustments internal to the electronic weight transmitter may be made with ease by removing screws 120 and 122 which secure cover 14. Once screws 120 and 122 are removed, cover 14 may be readily lifted upward to expose most of the interior adjustments. In addition, plate 124 may be removed by removing screws 126 and 128 in order to expose nuts 108. When cover 14 is secured on base 12, diaphragm 130 prevents dirt or other foreign particles from entering the interior of the electronic weight transmitter around load receiving means 54.

In operation, the electronic weight transmitter is mounted so that the load is applied to weight receiving means 54 in the direction of arrow 52. Weight receiving means 54 is threadedly mounted on member 30 so that the height of weight receiving means may be readily adjusted to contact the carriage of a conveyor or other item to be weighed when no load is on the carriage of the conveyor or other item. The load applied to load receiving means 54 in the direction of arrow 52 causes the downward vertical deflection of members 26 and 28 against the restraining force of torsion bar 72. It may be noted that torsion bar 72 has been mounted between one side of member 26 and base 12 of the electronic weight transmitter. Although a symmetrical torsion bar may be used in place of torsion bar 72, a torsion bar such as torsion bar 72 having the twist or torque portion of the bar located wholly on one side of member 26 is preferred in order to prevent any error arising from deflection of the torsion bar in a vertical direction as contrasted to the twisting motion of the bar for which a torsion bar is calibrated. That is, in accordance with a preferred embodiment disclosed herein, it is preferred to use a torsion bar in which the twisting momentum of member 26 is applied at one end of the torsion bar rather than to the center of a torsion bar having a torque restraining portion of the bar on each side of member 26.

As members 26 and 28 are forced downward by a member 30 against the restraining force of torsion bar 72, core 84, as shown in FIG. 5, is forced downward through linear variable differential transformer 74. The movement of core 84 downward varies the coupling between primary winding 82 and secondary windings 86 and 88, respectively. The output of demodulator 90, in response to the varied coupling, produces an output proportional to the weight applied to load receiving means 54.

Although a preferred embodiment of the present invention has been described in detail, it will be apparent to those skilled in the art that various modifications and changes may be made thereto and that various other devices may be substituted therein to perform the same function in substantially the same manner. For example, although the deflection of members 26 and 28 have been described as being in a vertical direction, it is understood that the device may be mounted in any other direction. That is for example although a weight measurement would normally be made in the vertical direction, the apparatus of the present invention may be used to provide an indication of a force in any particular direction. Also, it is apparent that many and various modifications may be made in the structure of base 12 and the manner in which the members are mounted together and to the base structure 12 in order to form a parallelogram structure. Furthermore, other suitable types of electrical transducers may be used to convert the motion of the parallelogram structure into an electrical signal.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. Apparatus for producing an electrical signal indicative of a force applied thereto, comprising:
    a base;
    a first, second and third member, said first, second and third member and said base being connected together by substantially frictionless pivot means at pivot points to form a parallelogram structure;
    a torsion bar, said torsion bar being mounted at one of said pivot points to apply a restraining force which tends to restrain movement of said first, second and third member when a force is applied to the parallelogram structure; and
    an electrical transducer mounted in a position to receive the motion of said parallelogram structure for converting the movement of said parallelogram structure into an electrical output signal proportional to said movement which is proportional to the applied force.

2. Apparatus in accordance with claim 1 wherein said electrical transducer is a linear variable differential transformer.

3. Apparatus in accordance with claim 2 wherein said linear variable differential transformer comprises:
    a primary winding;
    a first and a second secondary winding coupled to said primary winding, said first and second secondary windings being spaced from each other;
    an oscillator for supplying said primary winding with an alternating current;
    a movable magnetic core, said magnetic core varying the coupling between said primary winding and said first and secondary windings, respectively, when moved; and means for rectifying the output of said first and second secondary windings and producing a difference output signal indicative of the position of said magnetic core.

4. Apparatus for producing an electrical signal indicative of a weight applied thereto, comprising:

a base having a projecting member thereon;

a first member pivotally connected at a first point on said first member to a first point on said projecting member of said base;

a second member pivotally connected at a first point on said second member to a second point on said projecting member;

a third member pivotally connected at a first point on said third member to a second point on said first member, said second point being a predetermined distance from said first point on said first member, said third member being pivotally connected at a second point on said third member to a second point on said second member, said second point on said second member being said predetermined distance from said first point on said second member;

a torsion bar mounted at one of the first and second pivot points on said projecting member of said base, said torsion bar being mounted to the base at one point on the torsion bar and to one of said first and second members at a second point on the torsion bar;

a linear variable differential transformer having a movable magnetic core and an output, said linear variable differentransformer being mounted on said base, said movable magnetic core being mounted between said first and second members; and means for applying a weight to said first member at a point displaced from said first point on said first member whereby said movable magnetic core will be caused to move producing a voltage at said output of said linear variable differential transformer proportional to said applied weight.

5. Apparatus in accordance with claim 4 wherein said first point on said first and second members is adjacent one end of said first and second members, respectively, and the other ends of said first and second members extend beyond said second point on said first and second members by a predetermined distance, said movable magnetic core of said linear variable differential transformer being mounted between said other ends of said first and second members.

6. Apparatus in accordance with claim 4 wherein said third member comprises a yoke shaped member having a first and a second leg, said first and second leg extending on opposite sides of said first and second members.

7. Apparatus in accordance with claim 5 wherein a counterweight is mounted on said one end of said first member whereby a tare weight may be automatically compensated for.

8. Apparatus in accordance with claim 4 including an adjusting means for mechanically adjusting the position of said linear variable differential transformer, said adjusting means being provided with a threaded portion and a tapered portion, said threaded portion of said adjusting means being threadably mounted in said base and said tapered portion of said adjusting means contacting said linear variable differential transformer whereby the position of said linear variable differential transformer may be adjusted by turning said adjusting means threadably mounted in said base.

* * * * *